United States Patent [19]
Uchida et al.

[11] Patent Number: 6,159,529
[45] Date of Patent: *Dec. 12, 2000

[54] METHOD FOR ENHANCING THE SALTY-TASTE AND/OR DELICIOUS-TASTE OF FOOD PRODUCTS

[75] Inventors: Yukio Uchida; Satoshi Iritani; Toshio Miyake, all of Okayama, Japan

[73] Assignee: Kabushiki Kaisha Hayashibara Seibutsu Kagaku Kenkyujo, Okayama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,318

[22] Filed: Jun. 19, 1997

[30] Foreign Application Priority Data

Jun. 20, 1996 [JP] Japan .................................. 8-178700
Jun. 10, 1997 [JP] Japan .................................. 9-166711

[51] Int. Cl.⁷ .................................................. A23L 1/237
[52] U.S. Cl. ..................... 426/649; 426/650; 426/658; 426/548
[58] Field of Search ................... 426/443, 650, 426/658, 649, 548, 648

[56] References Cited

U.S. PATENT DOCUMENTS

| | | | |
|---|---|---|---|
| 2,299,999 | 10/1942 | Lippman | 426/649 |
| 2,385,412 | 9/1945 | Hall | 426/649 |
| 2,601,112 | 6/1952 | Freedman | 426/649 |
| 2,742,366 | 4/1956 | Power | 99/143 |
| 2,784,101 | 3/1957 | Diamond | 426/649 |
| 3,514,296 | 5/1970 | Frank et al. | 426/649 |
| 3,655,512 | 4/1972 | Tanaka et al. | 195/28 R |
| 3,860,732 | 1/1975 | Eisenstadt | 426/649 |
| 4,107,346 | 8/1978 | Kravitz | 426/648 |
| 4,216,244 | 8/1980 | Allen, Jr. et al. | 426/649 |
| 4,243,691 | 1/1981 | Mohlenkamp, Jr. et al. | 426/649 |
| 4,473,595 | 9/1984 | Rood et al. | 426/649 |
| 5,538,883 | 7/1996 | Nishimoto et al. | 435/200 |
| 5,543,513 | 8/1996 | Mandai et al. | 426/443 |
| 5,576,303 | 11/1996 | Shibuya et al. | 426/658 |
| 5,631,038 | 5/1997 | Kurtz et al. | 426/649 |

FOREIGN PATENT DOCUMENTS

| | | |
|---|---|---|
| 0 600 730 | 6/1994 | European Pat. Off. . |
| 0606753 | 7/1994 | European Pat. Off. . |
| 0 628 630 | 12/1994 | European Pat. Off. . |
| 0628630 | 12/1994 | European Pat. Off. . |
| 253456 | 2/1990 | Japan . |
| 5-184326 | 7/1993 | Japan . |
| 6-170221 | 6/1994 | Japan . |
| 7-213283 | 8/1995 | Japan . |

OTHER PUBLICATIONS

The Merck Index, 10th Ed., Merck & Co., Rahway NJ pp. 1370, 1983.
Webster's New Riverside University Dictionary, p. 859, 1169, 1984.
Rombauer et al, "Joy of Cooking", p. 525, 538, 1973.
Patent Abstracts of Japan, JP 07 289196, vol. 096, No. 003, Nov. 7, 1995.
Patent Abstracts of Japan, JP 07 308150, vol. 096, No. 003, Nov. 28, 1995.
Patent Abstracts of Japan, JP 07 227243, vol. 095, No. 011, Aug. 29, 1995.

*Primary Examiner*—Cynthia L. Nessler
*Attorney, Agent, or Firm*—Browdy and Neimark

[57] ABSTRACT

A method for enhancing the salty-taste and/or delicious-taste of food products and materials thereof, containing sodium chloride, by using trehalose without imparting any unsatisfactory taste and flavor. The content of trehalose to be incorporated is usually in the range of about 1.5–12% to the food products and materials thereof, on a dry solid basis. The method can reduce the content of sodium chloride used in conventional salty food products without losing their satisfactory salty-taste.

6 Claims, No Drawings

METHOD FOR ENHANCING THE SALTY-TASTE AND/OR DELICIOUS-TASTE OF FOOD PRODUCTS

BACKGROUND OF THE INVENTION

1. Field of the invention

The present invention relates to a method for enhancing the salty-taste and/or delicious-taste of food products, more particularly a method for enhancing the salty-taste and/or delicious-taste of food products and materials thereof characterized in that it uses trehalose, a food product and a material thereof with enhanced salty-taste and/or delicious-taste by use of trehalose, especially salt-reduced products and materials thereof, a process for producing them, and a trehalose-containing agent for enhancing the level of salty-taste and/or delicious-taste of food products and materials thereof.

2. Description of the Prior Art

Sodium chloride inseparably relates to our eating habits as a basic seasoning for imparting salty-taste to food products. Recently, it is said that excessive intake of sodium chloride is suspected to be an important factor of causing circulatory diseases such as high-blood pressure, renal diseases and heart diseases. Two to five g/day/adult is a physiologically required amount of sodium chloride; however, the Japanese take no less than 13 g on average. The Ministry of Health and Welfare of Japan recommends that the Japanese should be restricted to take 10 g or lower; particularly, persons with high-blood pressure preferably are recommended to take 7 g or lower.

In some processed foods, the content of sodium chloride is lowered and the replacement with other salty substances has been tried. It is noted that conventional food products with less sodium chloride generally deteriorate and lose their inherent taste and deliciousness. It is also known that food products, containing substitutes for sodium chloride, have unsatisfactory taste along with salty-taste: For example, excessive amount of potassium chloride may impart a bitter-taste to food products and deteriorate their delicious-taste.

Japanese Patent Laid-Open Nos. 53,456/90 and 184,326/93 disclose methods for enhancing the level of salty-taste of sodium chloride to provide salt-reduced food products. Japanese Patent Laid-Open No. 53,456/90 proposes a method comprising a step of adding to food products a decomposed solution, prepared by mixing water for hydrolysis with a mixture of citric acid-producing black koji and yellow koji. The latter method has a demerit that it cannot avoid the unsatisfactory taste and flavor inherent to the decomposed solution, resulting in deteriorating the taste and flavor of the final products.

Japanese Patent Laid-Open No. 184,326/93 proposes a method for adding to food products saturated aliphatic monocarboxylic acids with 3–8 carbons. This method has as a demerit that the unfavorable taste and flavor inherent in the acids are inevitable, resulting in deterioration of the taste and flavor of food products.

SUMMARY OF THE INVENTION

There has been required food products with an improved delicious-taste or flavor prepared by enhancing the salty- and delicious-taste of food products and materials thereof, containing sodium chloride or to be incorporated with sodium chloride, without imparting any unsatisfactory taste and flavor, more particularly, salt-reduced food products and materials thereof.

To solve the above object, the present inventors energetically studied the use of saccharides. As a result, they unexpectedly found that, unlike other saccharides, trehalose effectively enhances the level of salty- and delicious-taste of sodium chloride without imparting any unsatisfactory taste and flavor to food products and materials thereof, and it can be used to produce food products with satisfactorily taste and deliciousness, more particularly, salt-reduced food products and materials thereof. Thus, they accomplished this invention.

The present invention is mainly constructed by:

(1) A method for enhancing the salty-taste and/or delicious-taste of food products and materials thereof, characterized in that it uses trehalose;

(2) Food products and materials thereof whose salty-taste and/or delicious-taste are enhanced by trehalose, more particularly salt-reduced food products and materials thereof, and a process thereof; and (3) A trehalose-containing agent for enhancing the level of salty-taste and/or delicious-taste.

DETAILED DESCRIPTION OF THE INVENTION

The presence of sodium chloride and/or delicious taste-imparting substances are essential for the present method for enhancing the level of salty-taste and/or delicious-taste. These sodium chloride and delicious taste-imparting substances can be inherently present in food products and materials thereof or they can be incorporated into them after their processings to impart salty- and delicious-taste. Any sodium chloride in any form or shape can be used in the present invention as long as it is the compound. Therefore, high-purity sodium chloride including table salts can be arbitrarily used, and if necessary, others contained in seasonings for enhancing salty-taste, those in salty food products and those in bittern, sea waters and rock salts can be arbitrarily used, if only they do not cause undesirable effects. Any delicious taste-imparting substance can be used in the present invention as long as it imparts delicious-taste to food products: For example, commercially available monosodium glutamate or monosodium L-glutamate monohydrate, sodium inosinate, 5'-sodium guanylate, etc., can be satisfactorily used. The sodium chloride and delicious taste-imparting substances can be incorporated into food products and materials thereof before or after using trehalose, of course, it can be used with trehalose at the same time. Methods for incorporating sodium chloride into food products and materials thereof include adding, mixing, dissolving, and other conventional techniques. The incorporation can be effected by only sprinkling sodium chloride over food products and materials thereof to adhere thereupon.

The concentration of sodium chloride in food products widely varies depending on the types of food products, i.e., as soups have their own salty-taste and soy sauces have. However, specific food products have roughly a prescribed sodium chloride concentration.

Since the present invention enhances the level of salty-taste of sodium chloride and delicious taste-imparting substances by using trehalose, it can lower the concentration of sodium chloride and delicious taste-imparting substances used in food products and materials thereof, depending on the required level of enhancement.

The trehalose used in the present invention is a non-reducing disaccharide, composed of two α-D-glucose units which are linked via the 1,1-linkage, which enhances the salty-taste of sodium chloride and the delicious-taste of delicious taste-imparting substances. Preferably, the trehalose used in the present agent for enhancing the level of salty-taste and/or delicious-taste can be advantageously used and not specifically restricted to with respect to the preparation, origin and type. For example, anhydrous trehalose disclosed in Japanese Patent Laid-Open No. 170,221/94, "TREHAOSE", a crystalline trehalose hydrate prepared from starches by using an enzyme saccharification method as disclosed in Japanese Patent Laid-Open No. 213,283/95 and commercialized by Hayashibara Shoji, Inc., Okayama, Japan, and "TREHASTAR", a trehalose-containing saccharide syrup commercialized by the company can be advantageously used in the present agent for enhancing the level of salty-taste and/or delicious-taste.

The present method for enhancing the salty-taste of food products and materials thereof includes those which can enhance the level of salty- and delicious-taste, usually, the food products and materials thereof contain trehalose in an amount of at least about 1.5 w/w % (the wording "w/w %" will hereinafter be abbreviated as "%", if not specified otherwise), preferably, about 1.5–12%, more preferably, about 3–9% to the food products and materials thereof, on a dry solid basis (d.s.b.) to satisfactorily enhance the level of salty- and delicious-taste. When the trehalose content is below 1.5%, trehalose could not sufficiently enhance the level of salty- and delicious-taste, and the enhancement level lowers when the trehalose content exceeds 12%. In the present invention, sodium chloride should be present in an amount of at least about 1.5% to food products and materials thereof, d.s.b. When the content of sodium chloride is below 1.5%, trehalose could not effectively enhance the level of salty- and delicious-taste of the products, and the enhancement level lowers when the sodium chloride content exceeds 12%. In view of delicious-taste enhancement, at least about 1.5% sodium chloride should be used to attain a satisfactory enhancement, and a lower amount could not attain such an enhancement. In general, the amount of delicious taste-imparting substances is not specifically restricted to as long as it can attain the enhancement: For example, the substances can be added to food products in an equal amount to sodium chloride, preferably, about 0.1–50%.

The ratio of the lowest amount of trehalose, i.e. 1.5 w/w %, to the greatest amount of sodium chloride, i.e. 12 w/w %, gives 0.125, i.e. 1.5 divided by 12. And the ratio of the highest amount of trehalose to the lowest amount of sodium chloride is 8, i.e. 12 divided by 1.5.

When preparing salt-reduced food products and materials thereof, trehalose can be used together with a relatively-small amount of sodium chloride and/or used in combination with substituents for sodium chloride such as conventional potassium chloride and sodium citrate, other agents for enhancing salty-taste such as hydrolysate solutions of koji and monocarboxylic acids, and delicious taste-imparting substances such as monosodium glutamate, sodium inosinate and 5'-sodium guanylate. If desired, salt-reduced food products and materials thereof, with an improved taste preference and nutrient value, can be arbitrarily prepared by using trehalose and one or more appropriate additives such as flavoring agents, coloring agents, acids, sweeteners, delicious-taste imparting agents, spices, vitamins and minerals.

The present invention can be extensively used to enhance the level of salty-taste and/or delicious-taste or used in food products and materials thereof whose salty-taste and/or delicious-taste can be enhanced by trehalose, more particularly, used in salt-reduced food products and materials thereof.

The present invention can be arbitrarily applicable to and used in salt-reduced seasonings for foods such as a table salt, seasoned salt, soy sauce, powdered soy sauce, "miso", "funmatsu-miso" (a powdered miso), "moromi" (a refined sake), "hishio" (a refined soy sauce), "furikake" (a seasoned fish meal), "chazuke-no-moto" (a seasoning for boiled rice with tea), margarine, mayonnaise, dressing, vinegar, "sanbai-zu" (a sauce of sugar, soy sauce and vinegar), "funmatsu-sushi-su" (a powdered vinegar for sushi), "chuka-no-moto" (an instant mix for Chinese dish), "tentsuyu" (a sauce for Japanese deep-fat fried food), "mentsuyu" (a sauce for Japanese vermicelli), sauce, catsup, "yakiniku-no-tare" (a sauce for Japanese grilled meat), curry roux, instant stew mix, instant soup mix, "dashi-no-moto" (an instant stock mix), mixed seasoning, and "shin-mirin" (a synthetic mirin).

The present invention can be arbitrarily applicable to and used in food products, which contain sodium chloride as a seasoning or a secondary material, for example, "wagashi" (Japanese cakes) such as "senbei" (a rice cracker), "arare-mochi" (a rice-cake cube), "okoshi" (a millet-and-rice cake), "mochi" (a rice paste), "manju" (a bun with a bean-jam), "uiro" (a sweet rice jelly), "an" (a bean jam), "yokan" (a sweet jelly of beans), "mizu-yokan" (a soft adzuki-bean jelly), "kingyoku" (a kind of yokan), jelly, pao de Castella and "amedama" (a Japanese toffee); confectioneries such as bun, biscuit, cracker, potato chip, cookie, pie, pudding, butter cream, custard cream, cream puff, waffle, sponge cake, doughnut, chocolate, chewing gum, caramel and candy; noodles such as wheat vermicelli and Chinese noodle; boiled rice products such as "sushi" and boiled rice mixed with fish and vegetables; processed cereals such as artificially produced meat; pastes such as flour paste, peanut paste, fruit paste and spread; pickles and pickled products such as pickled ume (Japanese apricot), "fukujin-zuke" (a red colored radish pickle), "bettara-zuke" (a kind of whole fresh radish pickles), "senmai-zuke" (a kind of sliced fresh radish pickles), "rakkyo-zuke" (pickled shallots) and "miso-zuke" (a vegetable pickled with miso); premixes for pickles and pickled products such as "takuan-no-moto" (a premix for radish) and "hakusai-zuke-no-moto" (a premix for Chinese cabbage); meat products such as ham and sausage; products of fish meat such as fish ham, fish sausage, "kamaboko" (a steamed fish paste), "chikuwa" (a kind of fish paste) and "tenpura" (a Japanese deep-fat fried fish paste); "chinmi" (relish) such as "uni-no-shiokara" (salted guts of sea urchin), "ika-no-shiokara" (salted guts of squid), "amino-shiokara" (a salted mysid), "su-konbu" (a processed tangle), "saki-surume" (dried squid strips) and "fugu-no-mirin-boshi" (a dried mirin-seasoned swellfish); salted products such as salted vegetable, salted flower, and salted fish eggs of herring roe, walleye pollack and salmon roe; salted fishes and meats such as salted sardine, salted saury, salted mackerel, raw ham and bacon; opened and dried fishes such as salted sardine, salted horse mackerel, salted mackerel, squid and beef jerky; "tsukudani" (foods boiled down in soy sauce) such as those of laver, edible wild plants, dried squid, fish and shellfish; daily dishes such as "nimame" (a cooked bean), potato salad and "konbu-maki" (a tangle roll), fish seasoned with vinegar, and grilled salted-fish; boiled down products such as boiled fish, "chikuzen-ni" (a kind of cooked vegetables with soy sauce and other seasonings), "hira" (a kind of cooked foods), and boiled dishes in pan containing vegetables, fish and meat; milk products such as butter and processed cheese; canned and bottled products such as those of meat, fish meat, fruit and vegetable; soft drinks such tomato juice, sports drink, carbonated beverage, sour milk beverage, and beverage containing lactic acid bacteria; and instant foods such as instant pudding mix, instant hot cake mix, "sokuseki-men" (an instant noodle), "sokuseki-shiruko" (an instant mix of adzuki-bean soup with rice cake) and instant soup mix. The present invention can be arbitrarily used in the processes of materials of the above food products, particularly, salt-reduced food products and materials thereof. Examples of such materials are intermediate materials used in the processings of food products such as raw "an" (a paste of beans), gelatinized starch paste, wheat flower dough, liquid egg, milk serum, cream of milk, tangle extract, bonito extract, sea urchin extract, meat extract, fish meat paste, "shiitake" (a mushroom) extract, vegetable extract and fruit juice.

The present salt-reduced food products and materials thereof can be arbitrarily used as therapeutic and preventive foods for patients with circulatory diseases whose daily intake of sodium chloride is restricted, persons after diseases or in delicate health, infants, and aged persons.

The present salt-reduced food products can be also administered as a health feed to breeding animals such as domestic animals and poultry.

The present trehalose-containing agent for enhancing the level of salty-taste and/or delicious-taste can be substituted for conventional seasonings containing sodium chloride such as table salts, soy sauces, miso and sauces, and used in unsatisfactory taste foods with less salt and dull-taste, for example, pickles, curry rice and "tenpura" (a Japanese deep-fat fried food) to impart them a satisfactory taste.

The present agent for enhancing the level of salty- and/or delicious-taste consists of trehalose or comprises saccharides which contain trehalose, preferably in an amount of at least about 20%, more preferably at least about 30%, d.s.b. If necessary, trehalose can be used together with an adequate amount of one or more substances such as a relatively-small amount of sodium chloride and conventional substituents therefor such as potassium chloride and sodium citrate, salty-taste enhancers such as decomposition solution of koji, and monocarboxylic acid, mineral-enriching agents such as calcium chloride, magnesium sulfate, ferric citrate, milk serum minerals, and bittern, delicious taste-imparting agents such as monosodium glutamate, sodium inosinate, 5'-sodium guanylate, and seasonings such as peppers including Japanese pepper.

Any method for incorporating trehalose into food products and materials thereof can be used in the present invention as long as it can incorporate trehalose into and/or add trehalose to the above products before completion of their processings: Examples of such are conventional combining methods such as mixing, kneading, dissolving, soaking, spraying and injecting. It can be also used methods for sprinkling trehalose to the final products after their processings.

The present salt-reduced food products and materials thereof, with increased salty-taste and/or delicious-taste which result in reducing the content of sodium chloride, promote the treatment of circulatory diseases such as high-blood pressure, renal diseases and heart diseases, prevent geriatric diseases, and effectively maintain and promote the health and beauty.

The followings explain the present invention in detail:

EXPERIMENT 1

Influence of the coexistence of saccharide on the level of salty-taste of sodium chloride It was studied that how influences the coexisting saccharides on the level of salty-taste of sodium chloride. The sodium chloride used in this experiment was in reagent grade, and the saccharides used were glucose, fructose, maltose, sucrose, trehalose, erythritol, sorbitol, maltitol and lactitol in reagent grade, and dextrin (DE 8) in food grade. The experiment method was as follows: Prepare test aqueous solutions by dissolving in water sodium chloride and one of saccharides to give a respective concentration of 5%, d.s.b. While, as a control, a 5% saccharide-free aqueous sodium chloride solution was prepared. Comparing the level of salty-taste with that of the control, the test aqueous solutions were judge by a panel test on which saccharide lowered, gave no influence, or enhanced the level of salty-taste of sodium chloride. The number of panelists was 15 consisting of 9 males and 6 females, and the panel test was conducted at 24° C.

The results were in Table 1.

TABLE 1

| | Influence on salty-taste | | | |
|---|---|---|---|---|
| coexisting saccharide | Reduced | Unchanged | Enhanced | Judgement |
| Glucose | 3 | 12 | 0 | x |
| Fructose | 3 | 12 | 0 | x |
| Maltose | 1 | 14 | 0 | x |
| Sucrose | 3 | 12 | 0 | x |
| Trehalose | 0 | 0 | 15 | ◯ |
| Erythritol | 0 | 15 | 0 | x |
| Sorbitol | 2 | 13 | 0 | x |
| Maltitol | 0 | 15 | 0 | x |
| Lactitol | 3 | 12 | 0 | x |
| Dextrin (DE 8) | 5 | 10 | 0 | x |

Note:
Numerals in Table 1 are the numbers of panelists among 15 panelists. The symbols "◯" and "x" mean that the enhancement of the level of salty-taste of sodium chloride was found and not found, respectively.

As evident from Table 1, it was unexpectedly found that most of the saccharides tested did not influence the level of salty-taste of sodium chloride or even lowered the salty-taste, but the coexistence of trehalose strongly influenced on the level of salty-taste of sodium chloride and clearly enhanced the level. As was not shown in Table 1, all the panelists answered that the test aqueous solution containing trehalose gave no unsatisfactory taste and flavor, revealing that there is no anxiety of deteriorating the flavor and taste of food products if coexisting trehalose with sodium chloride.

EXPERIMENT 2

Influence of the concentration of sodium chloride and trehalose on the enhancement of salty-taste It was studied the relationship between the concentrations of sodium chloride and trehalose on the enhancement of salty-taste. According to the method in Experiment 1, test aqueous solutions, dissolving sodium chloride and trehalose respectively in a concentration of 0.8, 1.5, 3, 6, 9 or 12%, d.s.b., were prepared. As a control, a trehalose-free aqueous solution containing 0.8–12% sodium chloride was prepared. It was evaluated on panel test with respect to the salty-taste on what concentration of the test aqueous solution was equal to that of the control. The salty-taste levels of the test aqueous solutions, judged by 12 of 15 panelists, were expressed by a relative sodium chloride concentration (%).

The results were in Table 2.

TABLE 2

| Sodium chloride concentration (%) | Trehalose concentration (%) | Relative concentration of sodium chloride (%) | Influence on salty-taste |
|---|---|---|---|
| 0.8 | 0.8 | 0.8 | No |
|  | 1.5 | 0.8 | No |
|  | 3 | 0.8 | No |
|  | 6 | 0.8 | No |
|  | 9 | 0.8 | No |
|  | 12 | 0.8 | No |
| 1.5 | 0.8 | 1.5 | No |
|  | 1.5 | 2 | Enhanced |
|  | 3 | 3 | Strongly enhanced |
|  | 6 | 3 | Strongly enhanced |
|  | 9 | 3 | Strongly enhanced |
|  | 12 | 2 | Enhanced |
| 3 | 0.8 | 3 | No |
|  | 1.5 | 4 | Enhance |
|  | 3 | 5 | Strongly enhanced |
|  | 6 | 6 | Strongly enhanced |
|  | 9 | 5 | Strongly enhanced |
|  | 12 | 4 | Enhanced |
| 6 | 0.8 | 6 | No |
|  | 1.5 | 9 | Strongly enhanced |
|  | 3 | 11 | Strongly enhanced |
|  | 6 | 11 | Strongly enhanced |
|  | 9 | 11 | Strongly enhanced |
|  | 12 | 9 | Strongly enhanced |
| 9 | 0.8 | 9 | No |
|  | 1.5 | 11 | Enhanced |
|  | 3 | 13 | Strongly enhanced |
|  | 6 | 13 | Strongly enhanced |
|  | 9 | 12 | Strongly enhanced |
|  | 12 | 10 | Enhanced |
| 12 | 0.8 | 12 | No |
|  | 1.5 | 13 | Enhanced |
|  | 3 | 14 | Strongly enhanced |
|  | 6 | 14 | Strongly enhanced |
|  | 9 | 14 | Strongly enhanced |
|  | 12 | 13 | Enhanced |

As evident from the results in Table 2, it was revealed that a combination use of at least 1.5%, preferably, about 1.5–12% of sodium chloride, d.s.b., and at least 1.5%, preferably, about 1.5–12%, more preferably, about 3–9% of trehalose, d.s.b., strongly enhanced the level of salty-taste of sodium chloride by about 1.2–2 times. Because the level of salty-taste of sodium chloride is enhanced by about 1.2 to 2 times, a food product according to the present invention can contain about 1/1.2 to 1/2 times the amount of sodium chloride to achieve the same high level of salty-taste. Also, because the level of salty-taste of sodium chloride is enhanced by about 1.2 to 2 times, at least about 17% less sodium chloride has to be used to give the same salty taste (100−100/1.2=17).

The results mean that the amount of sodium chloride, required for preparing food products, can be lowered by an amount equal to the level of salty-taste enhanced by trehalose. Thus, the salt-reduced food products according to the present invention can cut the amount of sodium chloride used in conventional food products by about 10–50% and arbitrarily used in food products to promote the treatment for patients with circulatory diseases, prevent geriatric diseases, and maintain and promote the health and beauty.

EXPERIMENT 3

Influence of the concentration of trehalose on the enhancement of salty-taste of aqueous solution containing sodium chloride and monosodium glutamate In accordance with the method in Experiment 1, an aqueous solution (I) containing 3% sodium chloride and 0.2% monosodium glutame, and another aqueous solution (II), containing 1.5% sodium chloride and 0.1% monosodium glutamate, obtained by diluting the aqueous solution (I) were prepared. Using the aqueous solutions (I) and (II) as controls, trehalose was dissolved therein to obtain 0.8, 1.5, 3, 6, 9 and 12%, d.s.b., of test aqueous solutions. Comparing the salty-taste and delicious-taste of the test aqueous solutions with those of the control ones, it was evaluated on panel test whether these tastes are reduced, unchanged or enhanced.

The results were in Tables 3 and 4:

TABLE 3

| Trehalose concentration (%) | 1.5% sodium chloride and 0.1% monosodium glutamate ||| |||
|---|---|---|---|---|---|---|
| | Salty-taste ||| Delicious-taste |||
| | Reduced | Unchanged | Enhanced | Reduced | Unchanged | Enhanced |
| 0.8 | 0 | 11 | 4 | 0 | 12 | 3 |
| 1.5 | 0 | 3 | 12 | 0 | 4 | 11 |
| 3 | 0 | 2 | 13 | 0 | 2 | 13 |
| 6 | 0 | 2 | 13 | 0 | 2 | 13 |

TABLE 3-continued

| | 1.5% sodium chloride and 0.1% monosodium glutamate | | | | | |
|---|---|---|---|---|---|---|
| Trehalose concentration | Salty-taste | | | Delicious-taste | | |
| (%) | Reduced | Unchanged | Enhanced | Reduced | Unchanged | Enhanced |
| 9 | 0 | 3 | 13 | 0 | 3 | 12 |
| 12 | 0 | 4 | 11 | 0 | 5 | 10 |

Note:
The numerals in Table 3 are the numbers of panelists among 15 panelists.

TABLE 4

| | 3.0% sodium chloride and 0.2% monosodium glutamate | | | | | |
|---|---|---|---|---|---|---|
| Trehalose concentration | Salty-taste | | | Delicious-taste | | |
| (%) | Reduced | Unchanged | Enhanced | Reduced | Unchanged | Enhanced |
| 0.8 | 0 | 10 | 5 | 0 | 11 | 4 |
| 1.5 | 0 | 3 | 12 | 0 | 5 | 10 |
| 3 | 0 | 2 | 13 | 0 | 2 | 13 |
| 6 | 0 | 1 | 14 | 0 | 2 | 13 |
| 9 | 0 | 1 | 14 | 0 | 3 | 12 |
| 12 | 0 | 2 | 13 | 0 | 4 | 11 |

Note:
The numerals in Table 4 are the numbers of panelists among 15 panelists.

As evident from the results in Tables 3 and 4, it was revealed that the aqueous solutions containing sodium chloride and monosodium glutame enhanced both the salty- and delicious-taste when trehalose was coexisted, particularly, at a concentration of least 1.5% trehalose, d.s.b. Based on this, the use of trehalose enhances the salty- and delicious-taste of seasonings containing sodium chloride and monosodium glutamate, resulting in facilitating the productions of food products with less seasonings containing sodium chloride without deteriorating the flavor and taste. Thus, the salt-reduced food products thus obtained can be arbitrarily used as therapeutic and preventive foods for patients with circulatory diseases, persons after diseases or in delicate health, infants, and aged persons.

The preferred examples of the present invention are as follows:

EXAMPLE 1

Table salt with less sodium chloride

A table salt with less sodium chloride was prepared by mixing to homogeneity 60 parts by weight of sodium chloride and 40 parts by weight of anhydrous trehalose. Because the product contains sodium chloride and trehalose and enhances the salty-taste even with a lesser sodium chloride, it can be arbitrarily used similarly as conventional ones to season vegetable salads, boiled eggs, rice balls and pickles, and you can satisfactorily enjoy them. The product has a feature that trehalose in the product prevents sodium chloride from absorbing moisture to cause solidification, and it can be arbitrarily used in food products to promote the treatment for patients with circulatory diseases, prevent geriatric diseases, and maintain and promote the health and beauty.

EXAMPLE 2

Seasoned salt with less sodium chloride

A seasoned salt with less sodium chloride was prepared by mixing to homogeneity 60 parts by weight of sodium chloride, 30 parts by weight of "TREHAOSE", a crystalline trehalose hydrate, 9 parts by weight of potassium chloride, and one part by weight of monosodium glutamate. The product, containing sodium chloride, monosodium glutamate and trehalose, enhances the salty-taste and delicious-taste. Although the product has a lesser sodium chloride, it can be used similarly as conventional ones to season food products and you can enjoy their flavor and taste. The product can be arbitrarily used in food products to promote the treatment for patients with circulatory diseases, prevent geriatric diseases, and maintain and promote the health and beauty.

EXAMPLE 3

Salt-reduced soy sauce

A salt-reduced soy sauce with enhanced salty-taste and delicious-taste was prepared by dissolving 3% "TREHAOSE", a crystalline trehalose hydrate commercialized by Hayashibara Shoji, Inc., Okayama, Japan, in "Tokusen-marudaizu-genen-shoyu", a salt-reduced soy sauce containing 8.9% sodium chloride and no trehalose, commercialized by Kikkoman Corporation, Tokyo, Japan. Comparing with the commercially available soy sauce, both the salty-taste and delicious-taste of the product were clearly enhanced by trehalose. In spite of a lesser content of sodium chloride, the product can be arbitrarily used similarly as conventional products to season boiled foods, daily dishes, grilled foods, and soups including miso soup, and you can enjoy their satisfactory flavor and taste.

EXAMPLE 4
Salt-reduced miso

A salt-reduced miso with enhanced salty-taste was prepared by dissolving 5% "TREHAOSE", a crystalline trehalose hydrate commercialized by Hayashibara Shoji, Inc., Okayama, Japan, in "Takeya-miso-shio-hikaeme", a salt-reduced miso containing 10.4% sodium chloride and with no trehalose, commercialized by Kabushiki Gaisha Takeya, Tokyo, Japan. Comparing with the commercialized salt-reduced miso, both the salty-taste and delicious-taste of the obtained product were clearly enhanced by trehalose. In spite of a lesser content of sodium chloride, the product can be arbitrarily used similarly as conventional products to season boiled foods, daily dishes, grilled foods, and soups including miso soup, and you can enjoy their satisfactory flavor and taste.

EXAMPLE 5
Salt-reduced mentsuyu (a sauce for noodles)

A salt-reduced mentsuyu with enhanced salty-taste was prepared in a conventional manner by mixing 40 parts by weight of a soup stock, prepared in a conventional manner using tangle and dried bonito, with 7 parts by weight of a salt-reduced soy sauce, 2 parts by weight of "TREHAOSE", a crystalline trehalose hydrate commercialized by Hayashibara Shoji, Inc., Okayama, Japan, and 10 parts by weight of mirin (a sweet sake). Similarly as above, another salt-reduced mentsuyu as a control was prepared except for not using the crystalline trehalose hydrate. Comparing the two types mentsuyu, the control lacked sharpness taste, while the product according to the present invention, containing both sodium chloride and trehalose, had an enhanced salty- and delicious-taste and you can enjoy the satisfactory taste and flavor similarly as conventional products with normal content of sodium chloride.

EXAMPLE 6
Salt-reduced sushi-su (a vinegar for sushi)

A salt-reduced sushi-su was prepared by dissolving in 30 parts by weight of a cereal vinegar 18 parts by weight of sucrose, 4 parts by weight of sodium chloride and 4 parts by weight of "TREHAOSE", a crystalline trehalose hydrate commercialized by Hayashibara Shoji Inc., Okayama, Japan. Similarly as above, another salt-reduced sushi-su as a control was prepared except for not using the crystalline trehalose hydrate. Comparing the two types sushi-su, the control lacked sharpness taste, while the product according to the present invention, containing both sodium chloride and trehalose, had an enhanced salty-taste and delicious-taste and you can use it to season boiled rice for sushi and enjoy its satisfactory taste and flavor similarly as conventional products with normal content of sodium chloride.

EXAMPLE 7
Salt-reduced premix for takikomi-gohan (a boiled rice with vegetables and chicken)

A salt-reduced premix for takikomi-gohan was obtained by preparing a seasoning by mixing 100 parts by weight of usukuchi-shoyu (a less-colored sweetened soy sauce), 50 parts by weight of sake, 5 parts by weight of sodium chloride, and 40 parts by weight of "TREHAOSE", a crystalline trehalose hydrate commercialized by Hayashibara Shoji Inc., Okayama, Japan, and heat-boiling the seasoning with 100 parts by weight of an adequately-cut burdock, 150 parts by weight of shiitake, 300 parts by weight of chicken, 150 parts by weight of carrot, 100 parts by weight of fried bean curd, 100 parts by weight of a paste made from konjak flour, 10 parts by weight of kneaded sesame, and one part by weight of monosodium glutamate. The resultant mixture was mixed with a solution prepared by dissolving by heating 3 parts by weight of pullulan and 3 parts by weight of agar in 130 parts by weight of water. The product thus obtained can be used by mixing with an adequate amount of boiled rice. Similarly as above, another salt-reduced premix for takikomi-gohan as a control was prepared except for not using the crystalline trehalose hydrate. Comparing the two types products, the control lacked sharp taste, while the product according to the present invention, containing sodium chloride, trehalose and monosodium glutamate, had an enhanced salty-taste and delicious-taste and you can enjoy the satisfactory taste and flavor similarly as conventional products with normal content of sodium chloride.

EXAMPLE 8
Opened and dried hose mackerel with less sodium chloride

Hose mackerels were opened and dried in a conventional manner, and then soaked for 30 min in a liquid seasoning prepared by dissolving in 1,000 parts by weight of water 100 parts by weight of sodium chloride, and 50 parts by weight of "TREHAOSE", a crystalline trehalose hydrate commercialized by Hayashibara Shoji Inc., Okayama, Japan, and dried with air heated to 30° C. for one hour to obtain the desired product. Similarly as above, another opened and dried hose mackerel with less sodium chloride as a control was prepared except for not using the crystalline trehalose hydrate. Comparing the two types products, the control lacked sharpness taste, while the product according to the present invention, containing both sodium chloride and trehalose, had an enhanced salty-taste and delicious-taste. The product quickens your appetite and you can enjoy the satisfactory taste, flavor, color and gloss similarly as conventional products with normal content of sodium chloride.

EXAMPLE 9
Salt-reduced beef jerky

One thousand parts by weight of round was sliced in 5-mm thick along with the muscle, and the slices were seasoned with a mixed seasoning, containing 15 parts by weight of sodium chloride, 30 parts by weight of "TREHAOSE", a crystalline trehalose hydrate commercialized by Hayashibara Shoji Inc., Okayama, Japan, 80 parts by weight soy sauce, 200 parts by weight of red wine, and adequate amounts of onion, garlic, chilli powder, pepper and tabasco, and allowed to stand in a refrigerator for 12 hours. Thereafter, the slices were washed with flowing water to remove unfavorable harshness and excessive amounts of seasonings, dried with air for one day, further dried at 60° C. for 5 hours, and smoked for one hour to obtain the desired product. Similarly as above, another salt-reduced beef jerky as a control was prepared except for not using the crystalline trehalose hydrate. Comparing the two types products, the control lacked sharpness taste, while the product according to the present invention, containing both sodium chloride and trehalose, had an enhanced salty-taste and delicious-taste. The product quickens your appetite and you can enjoy the satisfactory taste, flavor, color and gloss similarly as conventional products with normal content of sodium chloride.

EXAMPLE 10

Salt-reduced food boiled down in soy sauce

To 250 parts by weight of tangle, which had been removed sand, acid-treated and cut into squares, were added 180 parts by weight of soy sauce, 318 parts by weight of an amino acid solution, 20 parts by weight of sucrose, and 80 parts by weight of "TREHASTAR", a saccharide syrup containing about 30% trehalose, d.s.b., commercialized by Hayashibara Shoji Inc., Okayama, Japan, and boiled up to obtain the desired product while mixing with 12 parts by weight of monosodium glutamate and 8 parts by weight of caramel. Similarly as above, another salt-reduced food, boiled down with soy sauce, as a control was prepared except for not using the crystalline trehalose hydrate. Comparing the two types products, the control lacked sharpness taste, while the product according to the present invention, containing sodium chloride, trehalose and monosodium glutamate, had an enhanced salty-taste and delicious-taste. The product quickens your appetite and you can enjoy the satisfactory taste, flavor, color and gloss similarly as conventional products with normal content of sodium chloride.

EXAMPLE 11

Salt-reduced premix of corn potage soup

Thirty parts by weight of pregelatinized corn powder, 5 parts by weight of pregelatinized starch, 4 parts by weight of pregelatinized potato starch, 12 parts by weight of pregelatinized waxy corn starch, 7 parts by weight of sodium chloride, 7 parts by weight of "TREHAOSE", a crystalline trehalose hydrate commercialized by Hayashibara Shoji Inc., Okayama, Japan, 7 parts by weight of skim milk, and 0.5 part by weight of an onion powder were mixed well by grinding. The resulting powder was admixed with 0.5 part by weight of sorbitan fatty acid ester and 9 parts by weight of vegetable hydrogenated oil which had been melted by heating, and the mixture was fed to a fluidized-bed granulator, followed by granulation while spraying water to the contents, drying with air heated to 70° C., and sieving the dried product to obtain the desired product. The product easily disperses in hot water into a soup with satisfactory taste and flavor. Similarly as above, another salt-reduced corn potage soup as a control was prepared except for not using the crystalline trehalose hydrate. Comparing the two types products, the control lacked sharpness taste, while the product according to the present invention, containing both sodium chloride and trehalose, had an enhanced salty-taste and delicious-taste. The product can be arbitrarily used to promote the treatment for patients with circulatory diseases, prevent the geriatric diseases, and promote the health and beauty.

EXAMPLE 12

Agent for enhancing salty-taste

A table salt-like agent for enhancing salty-taste was prepared by injecting into a 300-ml container with a spout, 98 parts by weight of "TREHAOSE", a crystalline trehalose hydrate commercialized by Hayashibara Shoji Inc., Okayama, Japan, and 2 parts by weight of a powdery red pepper. The product can be used in place of conventional sodium chloride-containing seasonings such as table salts, soy sauces, miso and sauces by sprinkling over foods such as pickles, curry rice, and Japanese deep-fat fried food, which are low in salty-taste and sharpness-taste, to enhance the foods' salty-taste and delicious-taste and satisfactorily improve their taste. The product increases your pleasure of the table in spite of taking salt-reduced foods, and it can be arbitrarily used to promote the treatment for patients with circulatory diseases, prevent the geriatric diseases, and promote the health and beauty.

EXAMPLE 13

Agent for enhancing salty-taste

A table salt-like agent for enhancing salty-taste was prepared by injecting into a 300-ml container with a spout 80 parts by weight of "TREHAOSE", a crystalline trehalose hydrate commercialized by Hayashibara Shoji Inc., Okayama, Japan, 10 parts by weight of potassium chloride, 7 parts by weight of calcium chloride, and 3 parts by weight of magnesium sulfate. Similarly as the product in Example 12, the product can be used by sprinkling over foods such as pickles, curry rice, and Japanese deep-fat fried food, which are low in salty-taste and sharpness-taste, to enhance the foods' salty-taste and delicious-taste and satisfactorily improve their taste. With the product, you can pleasure your dishes with less sodium chloride. The product can be arbitrarily used to promote the treatment for patients with circulatory diseases, prevent the geriatric diseases, and promote the health and beauty because the product is enriched with minerals, which are easily deficient in the body, such as calcium and magnesium.

As described above, the present invention relates to a method for enhancing the salty-taste and/or delicious-taste of food products by using trehalose and enables you can enjoy conventional salt-reduced food products, which have a lesser salty-taste and unsatisfactory taste, similarly as conventional normally-salted foods in general with satisfactory taste. Since the present invention effectively reduces the daily intake of sodium chloride, it highly promotes the recovery of health of patients suffering from circulatory diseases such as high-blood pressure, renal diseases, and heart diseases, prevents geriatric diseases, and maintains and promotes the health and beauty. Thus, the establishment of the present invention would greatly influence on the fields of food-, pharmaceutical- and health-industries.

While there has been described what is at present considered to be the preferred embodiments of the invention, it will be understood the various modifications may be made therein, and it is intended to cover in the appended claims all such modifications as fall within the true spirit and scope of the invention.

We claim:

1. A method for enhancing the salty-taste and flavor of a food product containing about 0.1–50 w/w % sodium chloride, on a dry solid basis, by co-existing trehalose with said food product in an amount of 1.5–12 w/w % to said food product based on a dry solid basis, whereby the amount of sodium chloride is lowered by 1/1.2 to 1/2 fold amount of said about 0.1–50% w/w % sodium chloride while retaining at least the same level of salty-taste of the processed food product manufactured by using the amount of said about 0.1–50% w/w % sodium chloride.

2. A method for producing a processed food product having a salty-taste equivalent to a preselected amount of sodium chloride on a dry solid basis in the range of about 0.1–50 w/w %, which comprises enhancing the salty-taste and flavor of said product by adding trehalose and adding a lesser quantity of sodium chloride than said preselected amount in said food product, the difference between said preselected amount and said lesser quantity of sodium chloride being equal to the level of salty-taste enhancement provided by said trehalose, whereby the amount of sodium chloride is lowered by an amount of 1/1.2 to 1/2 from said about 0.1–50 w/w % sodium chloride while retaining at least the same level of salty-taste of the processed food product manufactured by using the amount of said about 0.1–50 w/w % sodium chloride.

3. In a method for manufacturing a processed food product having a salty-taste equivalent to a predetermined sodium chloride content within a range of about 0.1–50 w/w %, on a dry solid basis, the improvement wherein about 1.5–12 w/w % trehalose, on a dry solid basis, is added during the manufacturing of said processed food product, whereby the amount of sodium chloride is lowered by an amount of 1/1.2 to 1/2 times while retaining at least the same level of salty-taste of the processed food product manufactured by using the predetermined amount within the range of about 0.1–50 w/w % sodium chloride.

4. A method according to claim 3, wherein the amount of sodium chloride used is about 17% less than said salty-taste equivalent amount of sodium chloride or more than 17% less than said salty-taste equivalent amount.

5. In a method for manufacturing a processed food product having a salty-taste equivalent to a preselected sodium chloride content within the range of about 0.1–50 w/w %, on a dry solid basis, the improvement comprising adding about 1.5–12 w/w % trehalose, on a dry solid basis, to said processed food product along with a quantity of sodium chloride which is less than said preselected amount within said range of 0.15–50 w/w %, whereby the amount of sodium chloride in said food product is 1/1.2 to 1/2 times less than said preselected amount.

6. The method of claim 5, wherein the amount of sodium chloride added is about 17% less than said preselected amount or greater than 17% less than said preselected amount.

* * * * *